June 13, 1950    P. C. BARTON    2,511,035
COUPLING OR FASTENING FOR SCAFFOLDING
AND LIKE POLES
Filed Dec. 18, 1947
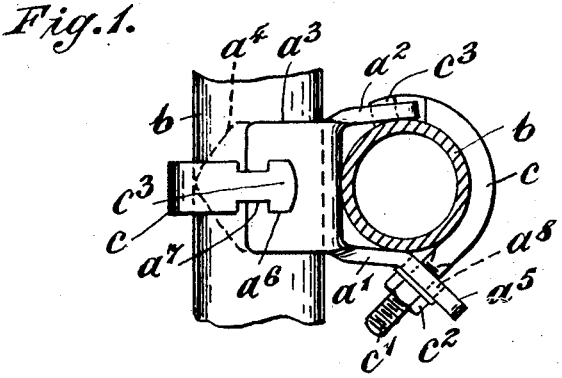
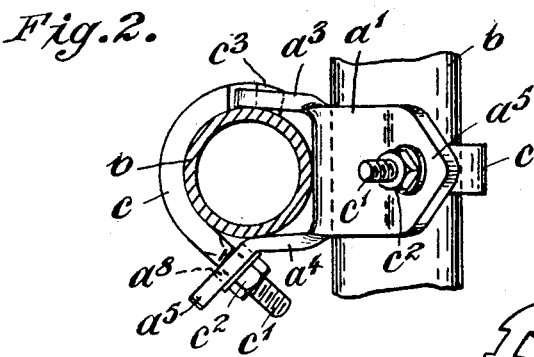
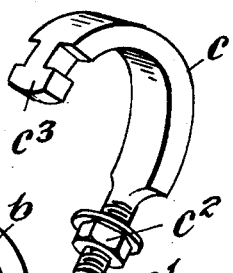
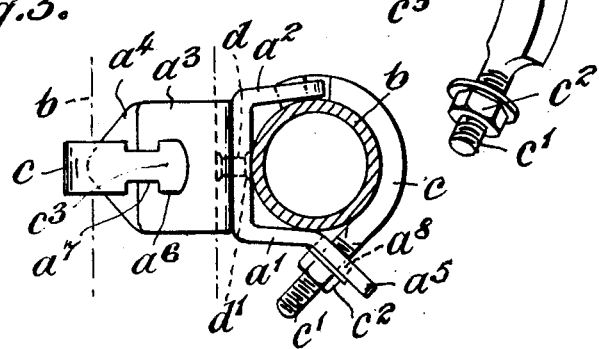
INVENTOR
PERCY CHARLES BARTON
BY Marshall and Marshall
ATTORNEYS Patented June 13, 1950

2,511,035

UNITED STATES PATENT OFFICE 2,511,035

COUPLING OR FASTENING FOR SCAFFOLDING AND LIKE POLES

Percy Charles Barton, Birmingham, England

Application December 18, 1947, Serial No. 792,446
In Great Britain December 21, 1946

1 Claim. (Cl. 287—54)

The present invention has reference to couplings or fastenings for scaffolding and like poles, and has for its object to provide such a device of simple construction and which is cheap to produce and at the same time particularly satisfactory and efficient in use.

According to the present invention the device comprises or includes a U-shaped socket into which the pole is adapted to be placed and maintained by virtue of a curved bolt or strap, the head or a part of which is accommodated in the transverse part of a T or equivalently shaped slot placed in one limb of the socket and the stem of the bolt or strap passed through an aperture in the other limb of the socket and secured by a nut.

Advantageously two outwardly facing U-shaped sockets are employed connected integrally in planes at right angles for the right angle reception of two poles, or alternatively two sockets may be operatively connected by a swivel engaging their yokes for adjustment purposes.

In order that this invention may be clearly understood and readily carried into practice reference may be had to the appended drawings, upon which—

Figure 1 illustrates in elevation a coupling constructed according to the present invention, the said coupling securing two poles at right angles.

Figure 2 is a plan view of the coupling shown in Figure 1.

Figure 3 illustrates a modified coupling incorporating a swivel, and

Figure 4 illustrates in perspective the bolt or strap.

In a convenient embodiment of the present invention the body of the device is stamped up or formed from a pressing of heavy gauge metal, substantially or cruciform. The arms $a^1 a^2$ and $a^3 a^4$ of this blank are bent outwardly in pairs and in opposite directions as illustrated to constitute two open sockets disposed at right angles to one another and into these sockets the tubes or poles $b$ are adapted to be placed with a snug or wedge fit. What may be considered an upper arm $a^2$ is slightly shorter than the lower arm $a^1$ and the longer lower arm is bent downwardly at $a^5$ so as to be disposed more or less in tangential relationship to the tube. The upper shorter arm $a^2$ is provided with a T-shaped slot illustrated more particularly at $a^6$ in the arm $a^3$, the stem $a^7$ of which is open to the forward edge of the arm and the lower longer arm has a circular aperture $a^8$ in the downwardly directed part $a^5$. In this invention there is utilized a bolt or strap $c$, see particularly Figure 4, the upper part of which is bent to the curvature of the tube as illustrated and the lower screw-threaded part $c^1$ complete with nut $c^2$ is of straight configuration. The head $c^3$ of the bolt or strap is of T-formation, is adapted to engage the T-shaped slot $a^6$, $a^7$, and the curved stem of this hook shaped bolt or strap follows the contour of the tube $b$ whence it straightens and passes through the aperture $a^8$ in the lower arm $a^5$ and is engaged by the nut $c^2$ under the underside of the said arm $a^5$. When the nut $c^2$ is tightened the bolt or strap $c$ is drawn onto the tube $b$ to grip same in a particularly efficient manner, the T-shaped head $c^3$ virtually sliding laterally in the slot $a^6 a^7$. To release the tube $b$ it is only necessary to slacken off the nut $c^2$ and inasmuch as the bolt or strap is engaged with the arm $a^5$ through an aperture $a^8$ and secured by a nut $c^2$ it is not likely to become inadvertently separated therefrom. The present invention has been described primarily with regard to the one socket and fastening bolt, but it will be appreciated that the complementary one is constructed and functions in an identical manner.

In a modification of the present invention illustrated in Figure 3, two separate U-shaped sockets $a^1 a^2$ and $a^3 a^4$ are connected by a central swivel $d$ in well known manner in connection with these couplings for permitting the tubes to be disposed at any desired angular relationship, the arrangement advantageously being such that when the curved bolt $c$ is tightened not only is the tube $b$ efficiently clinched, but it is caused to bear upon the head $d^1$ of the rivet in each instance, so that the two tubes $b$ are not only effectively gripped but maintained against any angular displacement.

I claim:

A coupling for crossed rods or pipes comprising, in combination, a pair of oppositely directed U-shaped sockets joined together in the bight areas, the arms of each of the U-shaped sockets being spaced apart a distance approximately equal to the diameter of the respective one of the rods to be secured thereby and extending parallelly a distance approximately equal to the radius of such rod, there being a T-shaped slot cut transversely through the end of one of said arms, the other arm having an extension angularly disposed relative to the arm at less than 90°, there being a hole pierced through said extension; and a clamp formed from material thicker than the material of the socket and having a substantially C-shaped body, the end of one arm thereof being formed into a T-shaped lug adapted to engage in the T-shaped slot in the arm of said socket, the other arm of the C-shaped clamp terminating in a straight threaded bolt-like and, the bolt being directed so as to be perpendicular to said extension on said other arm of said socket and to extend through the hole therein; whereby, upon assembly of said clamp with said socket, tightening a nut on said bolt-like end shifts said clamp transversely of the rod being secured and grips said rod between said T-shaped lug on the end of one arm of said clamp and the other arm of said socket.

PERCY CHARLES BARTON.

REFERENCES CITED

The following references are of record in the file of this patent:

UNITED STATES PATENTS

| Number | Name | Date |
|---|---|---|
| 959,528 | Herscher | May 31, 1910 |
| 1,553,800 | Brandt | Sept. 15, 1925 |
| 1,932,010 | Becker | Oct. 24, 1933 |

FOREIGN PATENTS

| Number | Country | Date |
|---|---|---|
| 71,175 | Germany | Sept. 26, 1893 |
| 340,337 | Italy | May 11, 1936 |
| 103,066 | Australia | Mar. 1, 1937 |